(12) United States Patent
Prakash et al.

(10) Patent No.: US 10,214,620 B2
(45) Date of Patent: Feb. 26, 2019

(54) NANO-REINFORCEMENT FILLER MATERIAL FOR EPOXY RESIN SYSTEMS AND METHODS OF MAKING THE SAME

(71) Applicant: The Boeing Company, Chicago, IL (US)

(72) Inventors: Om Prakash, Bangalore (IN); Megha Sahu, Bangalore (IN); Ashok Raichur, Bangalore (IN)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 15/582,475

(22) Filed: Apr. 28, 2017

(65) Prior Publication Data
US 2018/0312647 A1 Nov. 1, 2018

(51) Int. Cl.
| | | |
|---|---|---|
| C09C 3/10 | (2006.01) | |
| C08J 5/00 | (2006.01) | |
| C09C 1/44 | (2006.01) | |
| C08J 3/12 | (2006.01) | |
| C01B 32/198 | (2017.01) | |

(52) U.S. Cl.
CPC ............. *C08J 5/005* (2013.01); *C01B 32/198* (2017.08); *C08J 3/128* (2013.01); *C09C 1/44* (2013.01); *C09C 3/10* (2013.01); *C08J 2325/06* (2013.01); *C08J 2363/00* (2013.01); *C08J 2425/06* (2013.01)

(58) Field of Classification Search
CPC ............... C08J 5/005; C09C 1/44; C09C 3/10
See application file for complete search history.

(56) References Cited

U.S. PATENT DOCUMENTS

| | | | |
|---|---|---|---|
| 9,899,672 B2 * | 2/2018 | Zhamu | ................... H01M 4/366 |
| 2011/0017955 A1 * | 1/2011 | Zhamu e | ............ C08G 59/5033 |
| | | | 252/511 |

OTHER PUBLICATIONS

Chen, Li, et al., "Enhanced Epoxy/Silica Composites Mechanical Properties by Introducing Graphene Oxide to the Interface", ACS Applied Materials and Interfaces, 2012, 4, pp. 4398-4404.
Eksik, Osman, et al., "A novel approach to enhance the thermal conductivity of epoxy nanocomposites using graphene core-shell additives", Carbon 101, 2016, pp. 239-244.
Erdenedelger, Gansukh, et al., "Poly(methyl methacrylate)/Graphene Microparticles Having a Core/Shell Structure Prepared with Carboxylated Graphene as a Pickering Stabilizer", Macromolecular Chemistry and Physics, 2016, 217, pp. 570-580.
Fang, Ming, et al., "Constructing hierarchically structured interphases for strong and tough epoxy nanocomposites by amine-rich graphene surfaces", Journal of Materials Chemistry, 2010, 20, pp. 9635-9643.

Guo, Peng, et al., "Hollow graphene oxide spheres self-assembled by W/O emulsion", Journal of Materials Chemistry, 2010, 20, pp. 4867-4874.
Huang, Liang, et al., "Core-shell SiO2@RGO hybrids for epoxy composites with low percolation threshold and enhanced thermo-mechanical properties", Journal of Materials Chemistry A, 2014, vol. 2, pp. 18246-18255.
Johnsen, B.B., et al., "Toughness of syndiotactic polystyrene/epoxy polymer blends: microstructure and toughening mechanisms", Polymer, 46, 2005, pp. 7352-7369.
Liu, Yue, et al., "Polystyrene/graphene oxide nanocomposites synthesized via Pickering polymerization", Progress in Organic Coatings, 99, 2016, pp. 23-31.
Man, S.H. Che, et al., "Synthesis of Polystyrene Aanoparticles "Armoured" with Nanodimensional Graphene Oxide Sheets by Miniemulsion Polymerization", Journal of Polymer Science Part A: Polymer Chemistry, 2013, 51, pp. 47-58.
Man, S.H. Che, et al., "Influence of Monomer Type on Miniemulsion Polymerization Systems Stabilized by Graphene Oxide as Sole Surfactant", Journal of Polymer Science Part A: Polymer Chemistry, 2013, 51, pp. 5153-5162.
Rafiee, Mohammad A., et al., "Enhanced Mechanical Properties of Nanocomposites at Low Graphene Content", ACSNANO, vol. 3, No. 12, 2009, pp. 3884-3890.
Rafiee, Mohammad A., et al., "Fracture and Fatigue in Graphene Nanocomposites", Small, vol. 6, No. 2, 2010, pp. 179-183.
Ramanathan, T., et al., "Functionalized graphene sheets for polymer nanocomposites", Nature Nanotechnology, vol. 3, Jun. 2008, pp. 327-331.
Shao, Qingguo, et al., "Synthesis and characterization of graphene hollow spheres for application in supercapacitors", Journal of Materials Chemistry A, 2013, 1, pp. 15423-15428.
Tang, Long-Cheng, et al., "The effect of graphene dispersion on the mechanical properties of graphene/epoxy composites", Carbon, 60, 2013, pp. 16-27.
Thickett, Stuart C., et al., "Hollow hybrid polymer-graphene oxide nanoparticles via Pickering miniemulsion polymerization", Nanoscale, 2014, 6, pp. 8590-8594.

(Continued)

*Primary Examiner* — Hannah J Pak (57) ABSTRACT

A method of making a nano-reinforcement filler material for an epoxy resin system for a composite structure is provided. The method includes forming a polymer suspension of polymer nanoparticles suspended in deionized (DI) water, and sonicating the polymer suspension. The method includes forming a graphene oxide (GO) suspension of GO sheets suspended in DI water, and sonicating the GO suspension. The method includes mixing the sonicated polymer suspension and the sonicated GO suspension to obtain a sonicated mixture. The method includes heating the sonicated mixture in an inert atmosphere at an effective temperature, and using an electrostatic process to uniformly wrap individual polymer nanoparticles with individual GO sheets, via an electrostatic interaction reaction, to obtain the nano-reinforcement filler material comprising polymer-GO core-shell nanoparticles. The method includes washing and drying the nano-reinforcement filler material, and using it in the epoxy resin system for the composite structure.

19 Claims, 6 Drawing Sheets

(56) References Cited

OTHER PUBLICATIONS

Wan, Yan-Jun, et al., "Grafting of epoxy chains onto graphene oxide for epoxy composites with improved mechanical and thermal properties", Carbon, 69, 2014, pp. 467-480.
Wang, Xiao, et al., "An investigation of the mechanism of graphene toughening epoxy", Carbon, 65, 2013, pp. 324-333.
Yang, Shubin, et al., "Fabrication of Graphene-Encapsulated Oxide Nanoparticles: Towards High-Performance Anode Materials for Lithium Storage", Angew. Chem. Int. Ed., 2010, 49, pp. 8408-8411.
Yin, Guannan, et al., "Preparation of graphene oxide coated polystyrene microspheres by Pickering emulsion polymerization", Journal of Colloid and Interface Science, 394, 2012, pp. 192-198.
Zhang, Wen Ling, et al., "Graphene oxide coated core-shell structured polystyrene microspheres and their electrorheological characteristics under applied electric field", Journal of Materials Chemistry, 2011, 21, pp. 6916-6921.
European Patent Office Extended European Search Report, dated Sep. 5, 2018, for counterpart foreign application No. EP 18169530.5, Applicant The Boeing Company, 5 pages.

\* cited by examiner

NANO-REINFORCEMENT FILLER MATERIAL FOR EPOXY RESIN SYSTEMS AND METHODS OF MAKING THE SAME

BACKGROUND

1) Field of the Disclosure

The disclosure relates generally to reinforcement or toughening materials for composite structures, and more particularly, to nano-reinforcement filler materials for epoxy resin systems for composite structures, such as aircraft composite structures and other composite structures.

2) Description of Related Art

Composite materials are used in a wide variety of structures and component parts, including in the manufacture of aircraft, spacecraft, rotorcraft, watercraft, automobiles, trucks, and other vehicles, because of their high strength-to-weight ratios, corrosion resistance, and other favorable properties. In particular, in aircraft construction, composite structures and component parts are used in increasing quantities to form the fuselage, wings, tail section, skin panels, and other component parts of the aircraft.

Epoxy resins are commonly used as matrices for fiber-reinforced composite materials due to their high temperature performance, chemical resistance, and good adhesive properties. Such epoxy resins include epoxy polymers which are thermosetting structural polymers that become permanently hard after curing. However, epoxy polymers have a three-dimensional crosslinked structure that may result in a low resistance to crack propagation. Thus, reinforcement or toughening filler materials may need to be added to epoxy resins to improve fracture toughness, as well as to improve other mechanical and other physical properties.

Known reinforcement or toughening filler materials for epoxy resins exist. For example, such known reinforcement or toughening filler materials may include carboxyl-terminated butadiene-acrylonitrile (CTBN) rubbers and core-shell glass beads-polymer microspheres. However, while such known reinforcement or toughening filler materials may improve fracture toughness, they may adversely affect strength and other physical properties such as thermal properties.

In addition, known reinforcement or toughening filler materials for epoxy resins include nano-reinforcement filler materials such as inorganic silica nanoparticles. However, such inorganic silica nanoparticles have a high density which may result in undesirable high weight composites. High weight composite structures may be undesirable for aircraft, spacecraft, and other vehicles, as increased weight results in increased use of fuel, and in turn, increased costs. Thus, a composite material that enables the manufacture of lower weight structures is advantageous and desirable.

Further, known nano-reinforcement filler materials for epoxy resins include graphene and modified graphene reinforcement filler materials, such as graphene oxide (GO) nanosheets, i.e., GO sheets, obtained by oxidative exfoliation of graphite. Graphene oxide (GO) sheets have a large number of hydroxyl, epoxy, and carboxyl groups, which are chemically compatible with epoxy resin, at its surfaces and edges, and which provide the GO sheets with good functionalization, processing, and water solubility. Investigation of graphene oxide (GO) sheets has been made to enhance mechanical properties without compromising other physical properties at extremely low loading levels of 0.1 to 3 wt % (weight percent). However, there may be various issues, such as agglomeration of particles. In addition, it is not fully understood as to how the shape and size of such GO sheets may be controlled, which may influence the resulting properties of the composites.

In addition, when such known graphene oxide (GO) sheets (nanosheets) undergo a drying process after synthesis, they may undesirably restack on themselves. Use of a solvent may be needed to prevent or avoid the restacking of the individual GO sheets. However, the presence of any residual solvent may interfere with the crosslinking reaction between the GO sheets and the epoxy resin matrix and may adversely affect the mechanical properties of the epoxy resin matrix. To prevent or avoid the presence of any residual solvent, solvent removal may be required. Such solvent removal may involve the use of a vacuum oven or another solvent removal apparatus to remove the solvent. Such solvent removal may be very time consuming, i.e., 23 h (twenty-three hours), or more, and may be very costly. Although solvent-free loading has been used for synthesis of GO wrapped inorganic silica nanoparticles, there is a need for solvent-free loading for synthesis of GO wrapped organic nanoparticles, such as polymer nanoparticles.

Further, known nano-reinforcement filler materials for epoxy resins include known graphene oxide (GO) sheets (nanosheets) used with nanoparticles, such as polymer nanoparticles. However, such known GO wrapped polymer nanoparticles include polymer nanoparticles ranging in size from 350 nm (nanometers) to a few microns, which may, in turn, require the use of large size GO sheets. Large polymer nanoparticles may result in a reduction in the surface area of interaction or interface between the GO sheets and the epoxy resin matrix.

Moreover, large size GO sheets may cover many particles with a single GO sheet, resulting in agglomerated particle structure. Agglomerated particles wrapped in a single GO sheet may interfere in the curing reaction of epoxy with the resin matrix, which may, in turn, result in unsatisfactory mechanical properties of the nano-reinforcement filler materials.

Accordingly, there is a need in the art for an improved nano-reinforcement filler material and methods for making the same, used with epoxy resin systems for composite structures, that provide an enhanced interaction or with the epoxy resin matrix, that are solvent-free, that reduce synthesis or fabrication time, that reduce weight of the composite structure, and that provide advantages over known nano-reinforcement filler material materials and methods.

SUMMARY

This need for an improved nano-reinforcement filler material and methods for making the same, is satisfied. As discussed in the below detailed description, embodiments of the improved nano-reinforcement filler material and methods for making the same, may provide significant advantages over known materials and methods.

In an embodiment of the disclosure, there is provided a method of making a nano-reinforcement filler material for an epoxy resin system for a composite structure. The method comprises the step of forming a polymer suspension comprising a plurality of polymer nanoparticles suspended in deionized (DI) water. The method further comprises the step of sonicating the polymer suspension to obtain a sonicated polymer suspension.

The method further comprises the step of forming a graphene oxide (GO) suspension comprising a plurality of graphene oxide (GO) sheets suspended in deionized (DI) water. The method further comprises the step of sonicating the graphene oxide (GO) suspension to obtain a sonicated graphene oxide (GO) suspension.

The method further comprises the step of mixing the sonicated polymer suspension and the sonicated graphene oxide (GO) suspension together in a mixing vessel, to obtain a sonicated mixture. The method further comprises the step of heating the sonicated mixture in an inert atmosphere at an effective temperature, and using an electrostatic process to uniformly wrap individual polymer nanoparticles with individual graphene oxide (GO) sheets, via an electrostatic interaction reaction, to obtain the nano-reinforcement filler material comprising polymer-GO core-shell nanoparticles.

The method further comprises the steps of washing the nano-reinforcement filler material and drying the nano-reinforcement filler material. The method further comprises the step of using the nano-reinforcement filler material in the epoxy resin system for the composite structure, to provide a toughening nano-reinforcement to the epoxy resin system.

In another embodiment of the disclosure, there is provided a method of making a nano-reinforcement filler material for an epoxy resin system for a composite structure. The method comprises the step of forming a polystyrene (PS) suspension comprising a plurality of polystyrene (PS) nanoparticles suspended in deionized (DI) water. Each of the plurality of polystyrene (PS) nanoparticles has a particle size in a range of from about 40 nm (forty nanometers) to about 150 nm (one hundred fifty nanometers). The method further comprises the step of sonicating the polystyrene (PS) suspension to obtain a sonicated polystyrene (PS) suspension.

The method further comprises the step of forming a graphene oxide (GO) suspension comprising a plurality of graphene oxide (GO) sheets suspended in deionized (DI) water. The method further comprises the step of sonicating the graphene oxide (GO) suspension to obtain a sonicated graphene oxide (GO) suspension.

The method further comprises the step of mixing the sonicated polystyrene (PS) suspension and the sonicated graphene oxide (GO) suspension together in a mixing vessel, to obtain a sonicated mixture. The method further comprises the step of heating the sonicated mixture in an inert atmosphere at an effective temperature in a range of from about 70° C. (seventy degrees Celsius) to about 100° C. (one hundred degrees Celsius), and using an electrostatic process to uniformly wrap individual polystyrene (PS) nanoparticles with individual graphene oxide (GO) sheets, via an electrostatic interaction reaction, to obtain the nano-reinforcement filler material comprising polystyrene-GO core-shell nanoparticles.

The method further comprises the steps of washing the nano-reinforcement filler material, and drying the nano-reinforcement filler material. The method further comprises the step of using the nano-reinforcement filler material in the epoxy resin system for the composite structure, to provide a toughening nano-reinforcement to the epoxy resin system.

In another embodiment of the disclosure, there is provided a nano-reinforcement filler material for an epoxy resin system for a composite structure. The nano-reinforcement filler material comprises a plurality of polymer-graphene oxide (GO) core-shell nanoparticles. Each polymer-graphene oxide (GO) core-shell nanoparticle comprises a polymer core portion and a graphene oxide (GO) shell portion.

The plurality of polymer-graphene oxide (GO) core-shell nanoparticles comprise a plurality of polymer nanoparticles prepared by being suspended in deionized (DI) water, and then sonicated via a sonication process, to obtain a sonicated polymer suspension. Each polymer nanoparticle has a particle size in a range of from about 40 nm (forty nanometers) to about 150 nm (one hundred fifty nanometers), and each has a sphere shape (84).

The plurality of polymer-graphene oxide (GO) core-shell nanoparticles further comprise a plurality of graphene oxide (GO) sheets by being suspended in deionized (DI) water (102), and then sonicated via the sonication process, to obtain a sonicated graphene oxide (GO) suspension. The sonicated graphene oxide (GO) suspension is prepared separately from the sonicated polymer suspension. Each GO sheet has a sheet size in a range of from about 50 nm (fifty nanometers) to about 350 nm (three hundred fifty nanometers), and each has a planar shape.

The sonicated polymer suspension and the sonicated GO suspension are mixed together to obtain a sonicated mixture. The sonicated mixture is heated in an inert atmosphere and undergoes an electrostatic process to uniformly wrap individual polymer nanoparticles with individual graphene oxide (GO) sheets, via an electrostatic interaction reaction, to obtain the nano-reinforcement filler material. The nano-reinforcement filler material is further washed, dried, and used in the epoxy resin system for the composite structure.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and will fully convey the scope of the disclosure to those skilled in the art.

Figure 1:
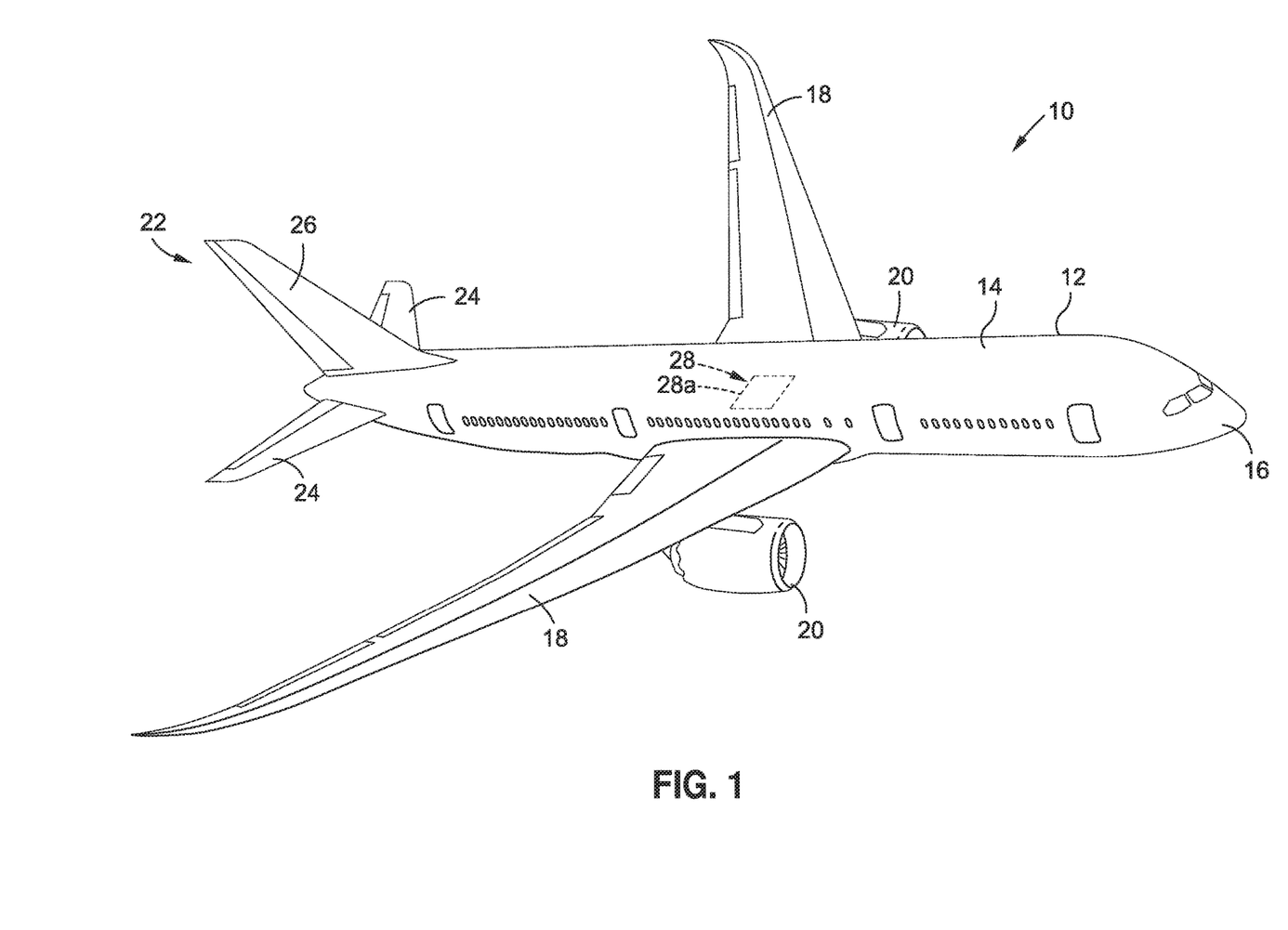
FIG. 1 is an illustration of a perspective view of an air vehicle that may incorporate one or more composite structures reinforced with an embodiment of the reinforcing filler material of the disclosure.

Now referring to the Figures, FIG. 1 is an illustration of a perspective view of an air vehicle 10, such as in the form of aircraft 12, that may incorporate one or more composite structures 28, such as in the form of epoxy composite structures 28a, reinforced with an embodiment of a nano-reinforcement filler material 150 (see FIGS. 4, 5) of the disclosure. As further shown in FIG. 1, the air vehicle 10, such as in the form of aircraft 12, comprises a fuselage 14, a nose 16, wings 18, engines 20, and an empennage 22 comprising horizontal stabilizers 24 and a vertical stabilizer 26.

Although the aircraft 10 shown in FIG. 1 is generally representative of a commercial passenger aircraft, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles. It may also be appreciated that composite structures reinforced with one or mo re embodiments of the nano-reinforcement filler material 150 (see FIGS. 4, 5), in accordance with the disclosure, may be utilized in other transport vehicles, such as boats and other watercraft, trains, automobiles, trucks, buses, or other suitable transport vehicles.

Figure 2:
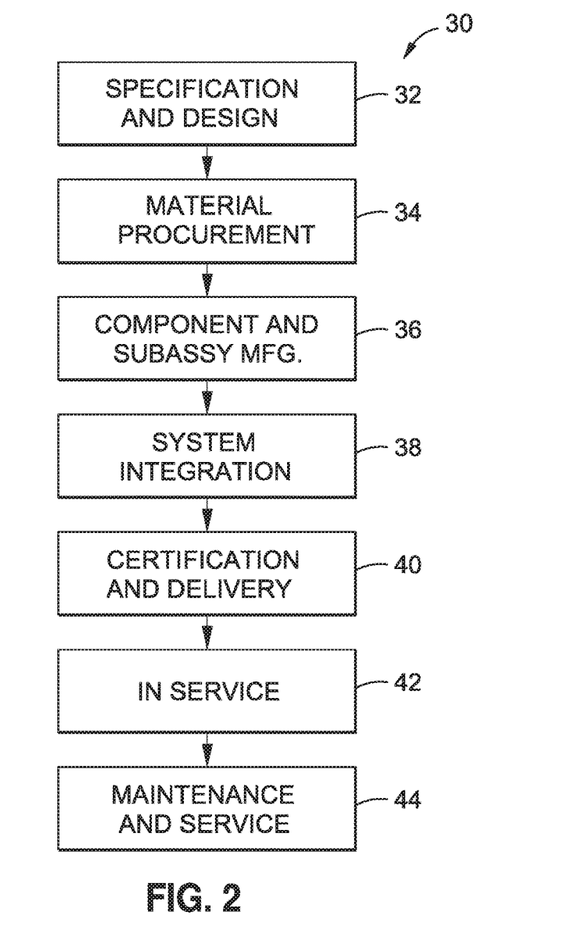
FIG. 2 is a flow diagram of an aircraft manufacturing and service method.
Figure 3:
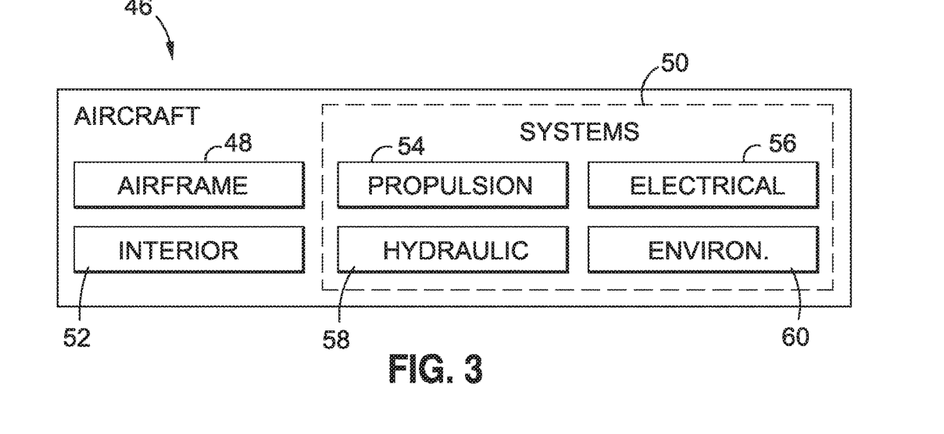
FIG. 3 is an illustration of a block diagram of an aircraft.

Now referring to FIGS. 2 and 3, FIG. 2 is a flow diagram of an aircraft manufacturing and service method 30, and FIG. 3 is an illustration of a block diagram of an aircraft 46. Embodiments of the disclosure may be described in the context of the aircraft manufacturing and service method 30, as shown in FIG. 2, and the aircraft 46, as shown in FIG. 3. During pre-production, the exemplary aircraft manufacturing and service method 30 (see FIG. 2) may include specification and design 32 (see FIG. 2) of the aircraft 46 (see FIG. 3) and material procurement 34 (see FIG. 2). During manufacturing, component and subassembly manufacturing 36 (see FIG. 2) and system integration 38 (see FIG. 2) of the aircraft 46 (see FIG. 3) takes place. Thereafter, the aircraft 46 (see FIG. 3) may go through certification and delivery 40 (see FIG. 2) in order to be placed in service 42 (see FIG. 2). While in service 42 (see FIG. 2) by a customer, the aircraft 46 (see FIG. 3) may be scheduled for routine maintenance and service 44 (see FIG. 2), which may also include modification, reconfiguration, refurbishment, and other suitable services.

Each of the processes of the aircraft manufacturing and service method 30 (see FIG. 2) may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may include an airline, leasing company, military entity, service organization, and other suitable operators.

As shown in FIG. 3, the aircraft 46 produced by the exemplary aircraft manufacturing and service method 30 may include an airframe 48 with a plurality of systems 50 and an interior 52. As further shown in FIG. 3, examples of the systems 50 may include one or more of a propulsion system 54, an electrical system 56, a hydraulic system 58, and an environmental system 60. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 30 (see FIG. 2). For example, components or subassemblies corresponding to component and subassembly manufacturing 36 (see FIG. 2) may be fabricated or manufactured in a manner similar to components or subassemblies produced while the aircraft 46 (see FIG. 3) is in service 42 (see FIG. 2). Also, one or more apparatus embodiments, method embodiments, or a combination thereof, may be utilized during component and subassembly manufacturing 36 (see FIG. 2) and system integration 38 (see FIG. 2), for example, by substantially expediting assembly of or reducing the cost of the aircraft 46 (see FIG. 3). Similarly, one or more of apparatus embodiments, method embodiments, or a combination thereof, may be utilized while the aircraft 46 (see FIG. 3) is in service 42 (see FIG. 2), for example and without limitation, to maintenance and service 44 (see FIG. 2).

Figure 4:
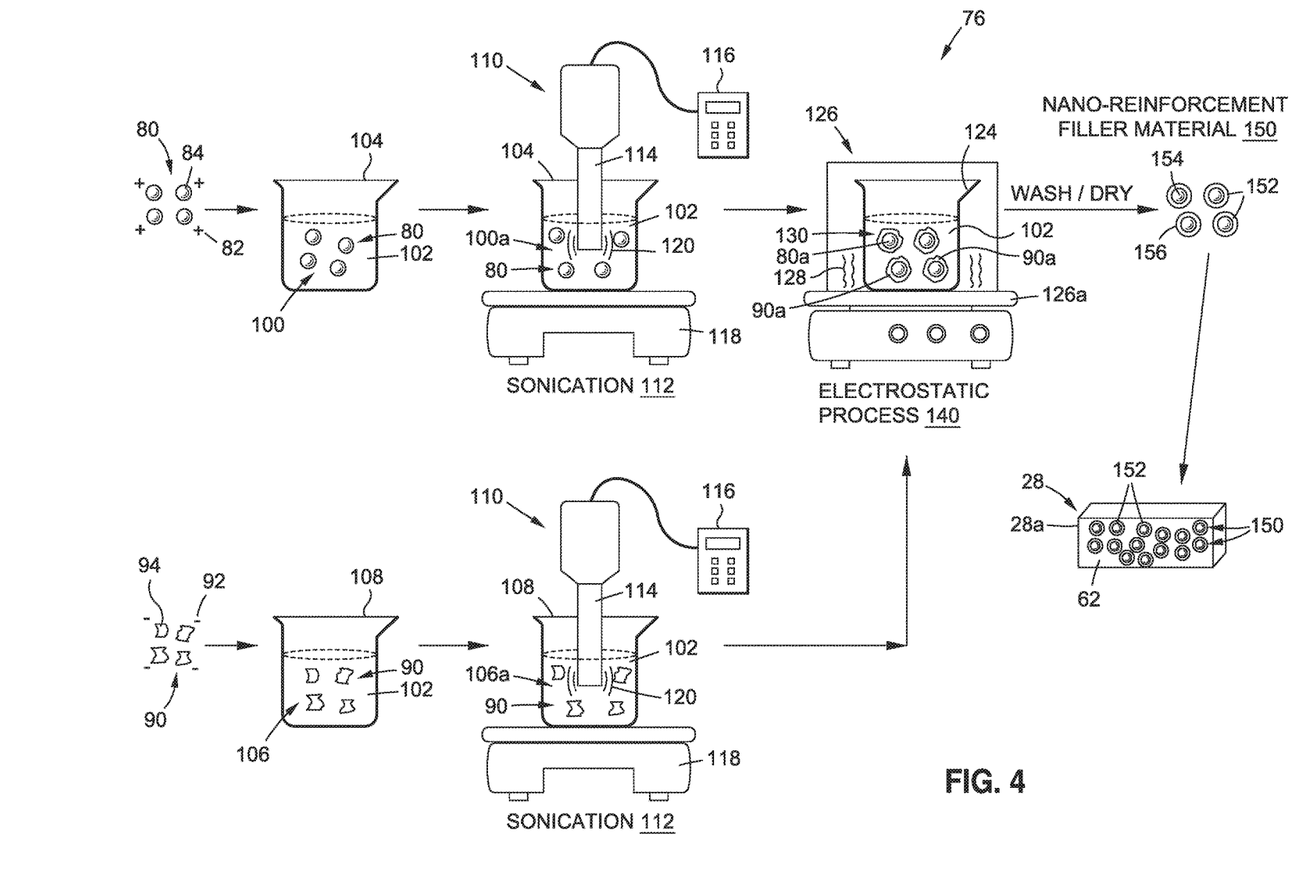
FIG. 4 is a schematic diagram showing the formation of an embodiment of the nano-reinforcement filler material of the disclosure.
Figure 5:
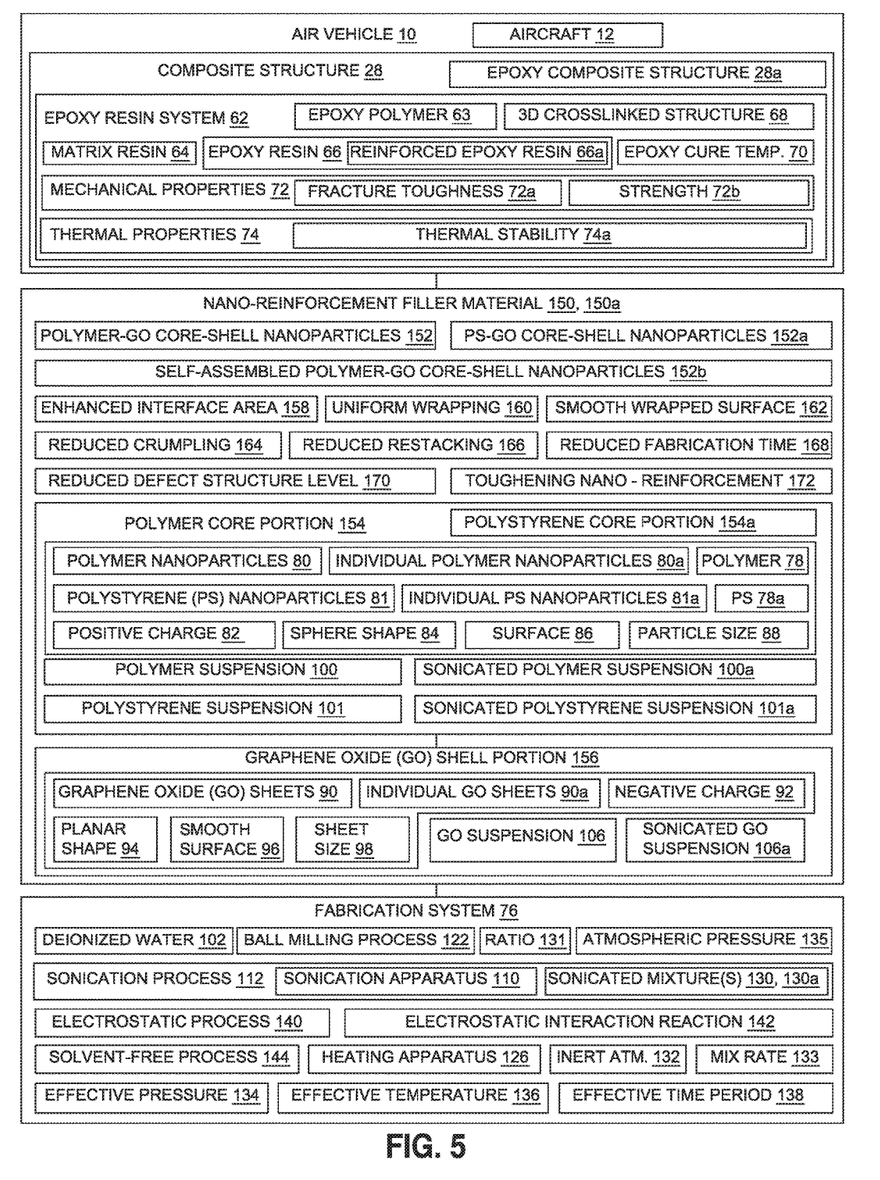
FIG. 5 is an illustration of a functional box diagram showing embodiments of the nano-reinforcement filler material and fabrication system of the disclosure.

Now referring to FIGS. 4 and 5, FIG. 4 is a schematic diagram showing the formation of an embodiment of the nano-reinforcement filler material 150 of the disclosure. FIG. 5 is an illustration of a functional box diagram showing embodiments of the nano-reinforcement filler material 150, 150a, and a fabrication system 76 of the disclosure. The nano-reinforcement filler material 150 will be discussed in conjunction with FIGS. 4 and 5.

FIG. 4 shows a plurality of polymer nanoparticles 80. Each of the plurality of polymer nanoparticles 80 (see FIGS. 4, 5) has a positive charge 82 (see FIGS. 4, 5), a sphere shape 84 (see FIGS. 4, 5), for example, a microsphere shape, and a surface 86 (see FIG. 5), for example, a curved surface.

Each of the plurality of polymer nanoparticles 80 (see FIGS. 4, 5) comprises a polymer 78 (see FIG. 5). The polymer 78 forms a polymer core portion 154 (see FIG. 5) of the nano-reinforcement filler material 150 (see FIGS. 4, 5).

The polymer 78 (see FIG. 5) is selected from the group consisting of, polystyrene (PS) 78a (see FIG. 5), poly (methyl methacrylate) (PMMA), poly(butyl acrylate) (PBA), poly(butyl acrylate) (PBA)-poly(methyl methacrylate) (PMMA) (PBA-PMMA), butyl methyl acrylate (BMA), polyvinyl acetate, polyvinyl acetate copolymers, polychloroprene (neoprene), nitrile rubber, acrylic rubber, fluoroelastomer (FKM), polyisoprene, polyvinylidene fluoride, polytetrafluoroethylene (PTFE), polyvinyl fluoride (PVF), acrylonitrile butadiene styrene (ABS), polyvinyl chloride (PVC), styrene-butadiene, or another suitable polymer. The polymer 78 (see FIG. 5) is preferably an allylic polymer, with or without surface functionalization. Preferably, the polymer 78 is polystyrene (PS) 78a (see FIG. 5). Polystyrene nanoparticles 81 (see FIG. 5) used in a nano-reinforcement material 150a (see FIG. 5) disclosed herein may be obtained from Polysciences, Inc. of Warrington, Pa.

Preferably, each polymer nanoparticle 80 (see FIGS. 4, 5) has a particle size 88 (see FIG. 5) in a range of from about 30 nm (thirty nanometers) to about 180 nm (one hundred eighty nanometers) More preferably, each polymer nanoparticle 80 (see FIGS. 4, 5) has a particle size 88 (see FIG. 5) in a range of from about 40 nm (forty nanometers) to about 150 nm (one hundred fifty nanometers). Most preferably, each polymer nanoparticle 80 has a particle size 88 in a range of from about 80 nm (eighty nanometers) to about 100 nm (one hundred nanometers).

FIG. 4 further shows the plurality of polymer nanoparticles 80 suspended in deionized (DI) water 102 in a first vessel 104, to form a polymer suspension 100. The fabrication system 76 (see FIG. 5) includes the DI water 102 (see FIG. 5). Preferably, the polymer suspension 100 (see FIG. 5) is a polystyrene suspension 101 (see FIG. 5). In one example of forming or preparing the polymer suspension 100 (see FIG. 5), polystyrene (PS) nanoparticles 81 (see FIG. 5) had a concentration of 12 mg/ml (twelve milligrams per milliliter) and were suspended in 200 ml (two hundred milliliters) of DI water 102 (see FIG. 5), at ambient temperature or room temperature.

FIG. 4 further shows the polymer suspension 100 comprising the plurality of polymer nanoparticles 80 suspended in the DI water 102, undergoing a sonication process 112 (see also FIG. 5), such as a bath sonication process, with a sonication apparatus 110 (see also FIG. 5), such as a bath sonicator. As used herein, "sonication process" means a process for applying energy, such as sound energy, through ultrasonic waves or other ultrasonic means, to agitate a suspension of particles, such as nanoparticles, in a liquid, such as deionized (DI) water, to evenly disperse the nanoparticles in the liquid and break up any agglomerates of the nanoparticles, and/or to provide energy for certain chemical reactions to proceed.

As shown in FIG. 4, the sonication apparatus 110 comprises a sonication probe portion 114, such as a sonicator, partially submerged in the polymer suspension 100 in the first vessel 104. The sonication probe portion 114 provides a high localized intensity directly above or near a sonication zone or area to be sonicated. However, the sonication apparatus 110 may also use other suitable types of devices besides a sonication probe portion to act as a sonicator, or the sonication apparatus may be in the form of a sonication bath with a bath sonicator. As further shown in FIG. 4, the sonication probe portion 114 is connected to a sonication controller portion 116 of the sonication apparatus 110. As further shown in FIG. 4, the first vessel 104 with the polymer suspension 100 is positioned on a sonication platform 118 of the sonication apparatus 110. The sonication probe portion 114 emits sound energy 120 into the polymer suspension 100 during the sonication process 112. The polymer suspension 100 undergoes the sonication process 112 (see FIGS. 4, 5) and a sonicated polymer suspension 100*a* (see FIGS. 4, 5) is obtained. The sonicated polymer suspension 100*a* (see FIG. 5) is a well-dispersed polymer particle suspension. When the polymer suspension 100 comprises a polystyrene suspension 101 (see FIG. 5), and the polystyrene suspension 101 undergoes the sonication process 112 (see FIGS. 4, 5), a sonicated polystyrene suspension 101*a* (see FIG. 5) is obtained. The sonicated polystyrene suspension 101*a* (see FIG. 5) is a well-dispersed polystyrene particle suspension. Preferably, the polymer suspension 100 undergoes the sonication process 112 at ambient temperature or room temperature, for a time period in a range of about 15 (fifteen) minutes to about 60 (sixty) minutes, and more preferably for a time period of 15 (fifteen) minutes. The sonication process 112 aids in preventing the formation of agglomerates (i.e., multiple nanoparticles stuck to each other) of polymer nanoparticles 80, and aids in removing formed agglomerates of polymer nanoparticles 80. However, conducting the sonication process 112 of the polymer suspension 100 for greater than 60 (sixty) minutes may want to be avoided, as it may lead to deformed morphology of the polymer nanoparticles 80, due to excessive exposure to ultrasonic waves.

FIG. 4 further shows a plurality of graphene oxide (GO) sheets 90, also referred to as GO nanosheets. Each of the plurality of GO sheets 90 (see FIGS. 4, 5) has a negative charge 92 (see FIGS. 4, 5), a planar shape 94 (see FIG. 5), for example, a planar sheet shape, and a smooth surface 96 (see FIG. 5). Each of the GO sheets 90 forms a graphene oxide (GO) shell portion 156 (see FIG. 5) of the nano-reinforcement filler material 150 (see FIGS. 4, 5).

Each of the plurality of GO sheets 90 (see FIGS. 4, 5) comprises graphene oxide (GO), the oxidized form of graphene produced via the oxidative exfoliation or oxidation of graphite in the presence of strong acid. GO comprises various oxygen-containing functional groups (e.g. hydroxyl, epoxy, carboxyl, ketone), which are chemically compatible with epoxy resin, at its surfaces and edges. The GO is preferably functionalized with small molecules or polymers for incorporation into organic matrices, such as epoxy resin matrices. The reduction of GO, via chemical or thermal methods, enables the partial restoration of the original graphenic framework. The GO sheets provide enhanced mechanical properties without compromising other physical properties at extremely low loading levels of 0.1 to 3 wt % (weight percent).

FIG. 4 further shows the plurality of graphene oxide (GO) sheets 90 suspended in deionized (DI) water 102 in a second vessel 108, to form a graphene oxide (GO) suspension 106. In one example of forming or preparing the GO suspension 106 (see FIGS. 4, 5), the GO sheets 90 (see FIG. 5) had a concentration of 1 mg/ml (one milligram per milliliter) and were suspended in 200 ml (two hundred milliliters) of DI water 102 (see FIG. 5), at ambient temperature or room temperature. The stability of the GO suspension 106 is very high and it may be suspended for 3 (three) months or longer before use.

FIG. 4 further shows the GO suspension 106 comprising the plurality of GO sheets 90 suspended in the DI water 102, undergoing the sonication process 112 (see also FIG. 5), such as the bath sonication process, with the sonication apparatus 110 (see also FIG. 5), such as a bath sonicator. As shown in FIG. 4, the sonication apparatus 110 comprises the sonication probe portion 114, such as a sonicator, partially submerged in the GO suspension 106 in the second vessel 108. However, the sonication apparatus 110 may also use other suitable types of devices besides a sonication probe portion to act as a sonicator. As further shown in FIG. 4, the sonication probe portion 114 is connected to the sonication controller portion 116 of the sonication apparatus 110. As further shown in FIG. 4, the second vessel 108 with the GO suspension 106 is positioned on the sonication platform 118 of the sonication apparatus 110. The sonication probe portion 114 emits sound energy 120 into the GO suspension 106 during the sonication process 112. The GO suspension 106 undergoes the sonication process 112 (see FIGS. 4, 5) and a sonicated GO suspension 106*a* (see FIGS. 4, 5) is obtained.

Preferably, the GO suspension 106 (see FIG. 5) undergoes the sonication process 112 (see FIG. 5) for an effective period of time to obtain a desired nano-size of the GO sheets 90 for coating the polymer nanoparticles 80, such as the polystyrene (PS) nanoparticles 81. When used to form the GO suspension 106 and prior to the sonication process 112, the GO sheets 90 initially have a sheet size 98 (see FIG. 5) in a range of from about 500 nm (five hundred nanometers) to about 5 (five) microns. The GO suspension 106 undergoes the sonication process 112 for an effective period of time to reduce the sheet size 98 (see FIG. 5) of the GO sheets 90, such as the lateral dimensions of the GO sheets 90. After undergoing the sonication process 112 for an effective period of time, the GO sheets 90 (see FIGS. 4, 5) preferably have a sheet size 98 (see FIG. 5) in a range of from about 50 nm (fifty nanometers) to about 350 nm (three hundred fifty nanometers); more preferably, in a range of from about 150 nm (one hundred fifty nanometers) to about 300 nm (three hundred nanometers); and most preferably, in a range of from about 200 nm (two hundred nanometers) to about 300 nm (three hundred nanometers).

As used herein, the "sheet size" of the GO sheets means the average sheet diameter or characteristic length scale of the GO sheets, including the lateral dimensions of the GO sheets. The sheet size 98 (see FIG. 5) of each individual or single GO sheet 90a (see FIG. 5) needs to be sufficient to completely and fully wrap the surface 86 (see FIG. 5) of a respective individual polymer nanoparticle 80a (see FIG. 5), where each polymer nanoparticle 80 has a particle size 88 (see FIG. 5) in a range of from about 30 nm (thirty nanometers) to about 180 nm (one hundred eighty nanometers). Each GO sheet 90 preferably has a thickness in a range of from about 1 nm (one nanometer) to about 5 nm (five nanometers).

Preferably, the GO suspension 106 undergoes the sonication process 112 at ambient temperature or room temperature, for a time period in a range of from about 1 h (one hour) to about 6 h (six hours). Preferably, during the sonication process 112 for the GO suspension 106, the room temperature is maintained below a thermal stability threshold of the GO sheets 90, for example, below 50° C. (fifty degrees Celsius). In one example, the GO suspension 106 was initially sonicated with the sonication process 112 (see FIGS. 4, 5) using the sonication apparatus 110 (see FIGS. 4, 5), in the form of a bath sonicator, for 2 h (two hours), at room temperature, and then was later sonicated with the sonication process 112 using the sonication apparatus 110 and the sonication probe portion 114 (see FIG. 4), for 3 h (three hours), at room temperature, in order to reduce the lateral dimension of the GO sheets 90.

The sonicated GO suspension 106a (see FIGS. 4, 5) is prepared separately from the sonicated polymer suspension 100a, either at a separate time and/or with a separate sonication apparatus 110 (see FIG. 4). Preferably, the sonication process 112 (see FIGS. 4, 5) reduces the lateral size of each individual GO sheet 90a (see FIG. 5) to a desired and acceptable size to effectively and uniformly wrap or coat each individual polymer nanoparticle 80a (see FIG. 5), such as each individual polystyrene (PS) nanoparticle 81a (see FIG. 5). The sonication process 112 is the preferred method to reduce the lateral size of the GO sheets 90 when the GO sheets 90 are in the form of the GO suspension 106 (see FIGS. 4, 5).

As an alternative to the sonication process 112, the GO sheets 90 (see FIG. 5) may undergo a ball milling process 122 (see FIG. 5). For example, the ball milling process 122 of graphite to nano-sized platelets may yield nano-sized GO sheets 90 without the sonication process 112. As used herein, "ball milling process" means using a ball mill grinder to grind and blend a material of use in a process, such as an electrostatic process. The ball mill is a cylindrical device used in grinding or mixing materials, and it rotates around a horizontal axis, partially filled with the material to be ground plus the grinding medium. Different materials are used as media, including ceramic balls, flint pebbles, and stainless steel balls. An internal cascading effect reduces the material to a fine powder.

As further shown in FIG. 4, a sonicated mixture 130, such as a physical mixture, is obtained when the sonicated polymer suspension 100a (see FIG. 5) and the sonicated GO suspension 106a (see FIG. 5) are mixed together, such as in a mixing vessel 124 with DI water 102, and heated with a heating apparatus 126, such as a hot plate 126a, or another suitable heating apparatus 126. The sonicated mixture 130 (see FIGS. 4, 5) is heated in an inert atmosphere 132 (see FIG. 5) and undergoes an electrostatic process 140 (see FIGS. 4, 5), or electrostatic phenomena, to uniformly wrap individual polymer nanoparticles 80a (see FIGS. 4, 5) with individual graphene oxide (GO) sheets 90a (see FIGS. 4, 5), via an electrostatic interaction reaction 142 (see FIG. 5), to obtain the nano-reinforcement filler material 150. As used herein, the electrostatic process, or electrostatic phenomena, means the forces that electric charges exert on each other, and involves the buildup of charge on the surface of objects due to contact with other surfaces.

The electrostatic process 140 (see FIGS. 4, 5) creates the electrostatic interaction reaction 142 (see FIG. 5) between the positively charged polymer nanoparticles 80 (see FIGS. 4, 5), such as, for example, the polystyrene (PS) nanoparticles 81a, and the negatively charged GO sheets 90 (see FIGS. 4, 5), to obtain the nano-reinforcement filler material 150 (see FIGS. 4, 5) comprising polymer-GO core-shell nanoparticles 152 (see FIGS. 4, 5). The electrostatic interaction reaction 142 (see FIG. 5) between the oppositely charged polymer nanoparticles 80 and the GO sheets 90 results in self-assembled polymer-GO core-shell nanoparticles 152b (see FIG. 5). The sheet size 98 (see FIG. 5) of each of the plurality of graphene oxide (GO) sheets 90 is preferably matched to the particle size 88 of each of the plurality of polymer nanoparticles 80, to facilitate uniform and complete wrapping or coating of the individual polymer nanoparticles 80a by the individual graphene oxide (GO) sheets 90a.

Preferably, the sonicated mixture 130 (see FIGS. 4, 5) is heated in an inert atmosphere 132 (see FIG. 5) at an effective temperature 136 (see FIG. 5) in a range of from about 70° C. (seventy degrees Celsius) to about 100° C. (one hundred degrees Celsius), is heated at an effective pressure 134 (see FIG. 5) comprising an atmospheric pressure 135 (see FIG. 5) in a range of from about 1 atm (one atmosphere) to about 12 atm (twelve atmospheres), and more preferably, at an atmospheric pressure 135 (see FIG. 5) of 1 atm (one atmosphere), and is heated for an effective time period 138 (see FIG. 5) in a range of from about 3 h (three hours) to about 6 h (six hours). Preferably, the heating of the sonicated mixture 130 (see FIGS. 4, 5) is performed at a mix rate 133 (see FIG. 5) of about 400 rpm (four hundred revolutions per minute). The self-assembly of the self-assembled polymer-GO core-shell nanoparticles 152b (see FIG. 5) that result in GO sheet 90 wrapped or coated polymer nanoparticles 80 preferably takes about 3 h (three hours) to about 6 h (six hours).

Preferably, the sonicated mixture 130 (see FIGS. 4, 5) comprises a ratio of the plurality of polymer nanoparticles 80 (see FIGS. 4, 5) to the plurality of graphene oxide (GO) sheets 90 (see FIGS. 4, 5), where the ratio is in a range of from about 5.58:1.12 (w/w) to about 6.09:0.91 (w/w). More preferably, the sonicated mixture 130 (see FIGS. 4, 5) comprises a ratio of the plurality of polymer nanoparticles 80 (see FIGS. 4, 5) to the plurality of graphene oxide (GO) sheets 90 (see FIGS. 4, 5), where the ratio is about 6:1 (w/w).

In addition, preferably the ratio of the plurality of polystyrene nanoparticles 81 to the GO sheets 90 is 6:1 and is the optimized ratio, as the smooth surface 96 (see FIG. 5) of each GO sheet 90 is more that that of the polystyrene (PS) nanoparticles 81. Thus, about 6 (six) parts by weight of polystyrene (PS) nanoparticles 81 is required per 1 (one) part by weight of GO sheets 90. Accordingly, 14.3 wt % (weight percent) of GO sheets 90 are required for 85.7 wt % of PS nanoparticles 81. Thus, to cover the upper and lower limits, the ratio may vary from 13 wt % of GO sheets 90 to 16% of GO sheets. This makes the PS nanoparticles to GO sheets range from 1.12 to 5.58, to 0.91 to 6.09. The ratio beyond this limit may lead to uncoated PS nanoparticles 81 or may lose GO sheets 90 in the sonicated mixture 130 (see FIG. 5).

As further shown in FIG. 4, the nano-reinforcement filler material 150 is further washed, dried, and used or incorporated in the epoxy resin system 62 (see FIG. 5) for the composite structure 28, such as the epoxy composite structure 28a. The drying of the nano-reinforcement filler material 150 (see FIGS. 4, 5) is preferably done at 45° C. (forty-five degrees Celsius) or another suitable temperature, in a hot air oven or other drying apparatus, for about 6-12 hours.

As further shown in FIG. 4, the nano-reinforcement filler material 150 comprises the polymer-GO core-shell nanoparticles 152, each with the polymer core portion 154 and the graphene oxide (GO) shell portion 156. Each GO shell portion 156 (see FIGS. 4, 5) has a smooth surface 96 (see FIG. 5) and completely and fully wraps or coats the polymer core portion 154 (see FIGS. 4, 5).

The nano-reinforcement filler material 150 (see FIGS. 4, 5) is preferably for use in an epoxy resin system 62 (see FIG. 5) for a composite structure 28 (see FIGS. 4, 5), such as an epoxy composite structure (see FIGS. 4, 5). As shown in FIG. 5, the epoxy resin system 62 comprises epoxy polymer 63 having a three-dimensional (3D) crosslinked structure 68. As further shown in FIG. 5, the epoxy resin system 62 comprises a matrix resin 64, such as in the form of an epoxy resin 66. The epoxy resin (see FIG. 5) may comprise a reinforced epoxy resin 66a (see FIG. 5) when reinforced with the nano-reinforcement material 150 (see FIG. 5). The epoxy resin system 62 (see FIG. 5) has an epoxy cure temperature 70, mechanical properties 72, such as fracture toughness 72a, strength 72b, and other suitable mechanical properties, and thermal properties 74, such as thermal stability 74a and other suitable thermal properties.

The nano-reinforcement filler material 150 (see FIG. 5) and the nano-reinforcement filler material 150a (see FIG. 5), are used in the epoxy resin system 62 (see FIG. 5) for the composite structure 28, preferably in an air vehicle 10 (see FIGS. 1, 5), such as an aircraft 12 (see FIGS. 1, 5). The nano-reinforcement filler material 150 (see FIG. 5) and the nano-reinforcement filler material 15a (see FIG. 5) have an enhanced interface area 158 (see FIG. 5) between the GO sheets 90 and the epoxy resin 66 (see FIG. 5) of the epoxy resin system 62 (see FIG. 5). The nano-reinforcement filler material 150 (see FIG. 5) and the nano-reinforcement filler material 15a (see FIG. 5) further have a uniform wrapping 160 and a tight wrapping or coating of the plurality of polymer nanoparticles 80 by the GO sheets 90, and the GO sheets 90 have a smooth wrapped surface 162 (see FIG. 5).

The nano-reinforcement filler material 150 (see FIG. 5) and the nano-reinforcement filler material 150a (see FIG. 5) are made with the DI water 102 (see FIGS. 4, 5) suspension, the sonication process 112 and the electrostatic process 140 that provide a reduced crumpling 164 (see FIG. 5) of the GO sheets 90 (see FIG. 5), a reduced restacking 166 (see FIG. 5) of the GO sheets 90 (see FIG. 5), a reduced fabrication time 168 (see FIG. 5), a reduced defect structure level 170 (see FIG. 5), a toughening nano-reinforcement 172 by the nano-reinforcement filler material 150 (see FIG. 5) and the nano-reinforcement filler material 150a (see FIG. 5), and a solvent-free process 144 (see FIG. 5).

Figure 6A:
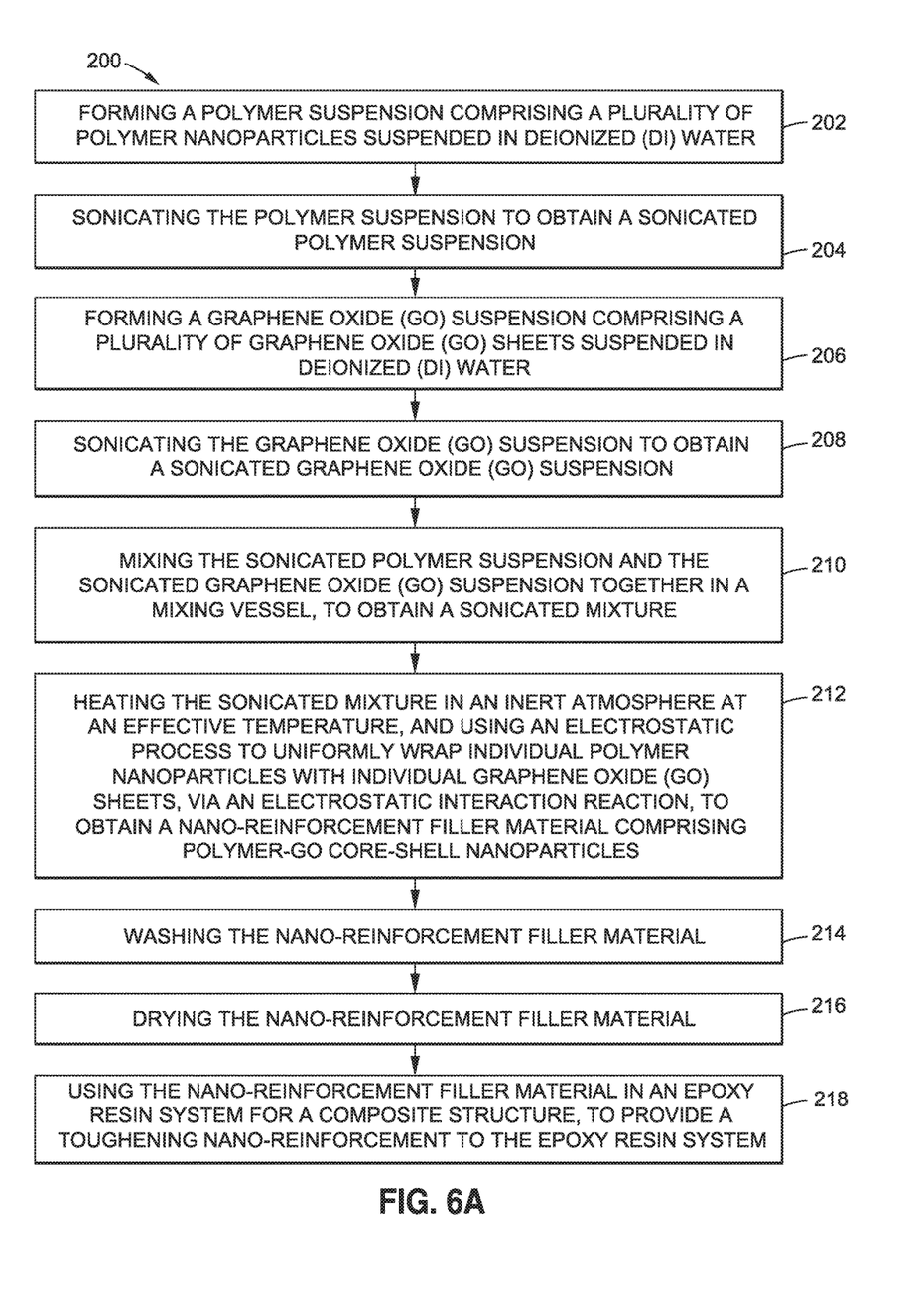
FIG. 6A is an illustration of a flow diagram of an exemplary embodiment of a method of the disclosure; and, FIG. 6B is an illustration of a flow diagram of another exemplary embodiment of a method of the disclosure.

Now referring to FIG. 6A, in another embodiment, there is provided a method 200 of making a nano-reinforcement filler material 150 (see FIGS. 4, 5) for an epoxy resin system 62 (see FIG. 4) for a composite structure 28 (see FIGS. 4, 5). FIG. 6A is an illustration of a flow diagram of an exemplary embodiment of the method 200 of the disclosure.

As shown in FIG. 6A, the method 200 comprises step 202 of forming or preparing a polymer suspension 100 (see FIGS. 4, 5) comprising a plurality of polymer nanoparticles 80 (see FIGS. 4, 5) suspended in deionized (DI) water 102 (see FIGS. 4, 5). The forming step 202 further comprises forming the polymer suspension 100 with each of the plurality of polymer nanoparticles 80. Preferably, each polymer nanoparticle 80 (see FIGS. 4, 5) has a particle size 88 (see FIG. 5) in a range of from about 30 nm (thirty nanometers) to about 180 nm (one hundred eighty nanometers). More preferably, each polymer nanoparticle 80 (see FIGS. 4, 5) has a particle size 88 (see FIG. 5) in a range of from about 40 nm (forty nanometers) to about 150 nm (one hundred fifty nanometers). Most preferably, each polymer nanoparticle 80 has a particle size 88 in a range of from about 80 nm (eighty nanometers) to about 100 nm (one hundred nanometers).

The forming step 202 further comprises forming the polymer suspension 100 (see FIGS. 4, 5) with each of the plurality of polymer nanoparticles comprising a polymer 78 (see FIG. 5) selected from the group consisting of, polystyrene 78a (see FIG. 5), poly(methyl methacrylate) (PMMA), poly(butyl acrylate) (PBA), poly(butyl acrylate) (PBA)-poly (methyl methacrylate) (PMMA) (PBA-PMMA), butyl methyl acrylate (BMA), polyvinyl acetate, polyvinyl acetate copolymers, polychloroprene (neoprene), nitrile rubber, acrylic rubber, fluoroelastomer (FKM), polyisoprene, polyvinylidene fluoride, polytetrafluoroethylene (PTFE), polyvinyl fluoride (PVF), acrylonitrile butadiene styrene (ABS), polyvinyl chloride (PVC), styrene-butadiene, or another suitable polymer.

As shown in FIG. 6A, the method 200 further comprises step 204 of sonicating the polymer suspension 100 (see FIGS. 4, 5) to obtain a sonicated polymer suspension 100a (see FIGS. 4, 5). The sonicated polymer suspension 100a (see FIG. 5) is a well-dispersed polymer particle suspension. The sonication process 112 (see FIGS. 4, 5) and the sonication apparatus 110 (see FIGS. 4, 5) are discussed in detail above with regard to FIGS. 4 and 5.

As shown in FIG. 6A, the method 200 further comprises step 206 of forming or preparing the graphene oxide (GO) suspension 106 (see FIGS. 4, 5) comprising the plurality of graphene oxide (GO) sheets 90 (see FIGS. 4, 5) suspended in deionized (DI) water 102 (see FIGS. 4, 5). The forming step 206 further comprises forming the graphene oxide (GO) suspension 106 with each of the plurality of graphene oxide (GO) sheets 90. The GO suspension 106 comprises the plurality of GO sheets 90 suspended in the DI water 102, and the plurality of GO sheets 90 may be suspended or mixed in the DI water 102 with the help of the sonication process 112 (see also FIG. 5), such as the bath sonication process, using the sonication apparatus 110 (see also FIG. 5), such as a bath sonicator.

As shown in FIG. 6A, the method 200 further comprises step 208 of sonicating the graphene oxide (GO) suspension 106 (see FIGS. 4, 5) to obtain a sonicated graphene oxide (GO) suspension 106a (see FIGS. 4, 5). The sonicated graphene oxide (GO) suspension 106a preferably has a reduced lateral dimension or size of the GO sheets 90. Based on process parameters (sonication energy and time), the sheet size 98 (see FIG. 5) of the GO sheets 90 may be tuned or tailored as desired. The sonication process 112 (see FIGS. 4, 5) and the sonication apparatus 110 (see FIGS. 4, 5) are discussed in detail above with regard to FIGS. 4 and 5.

Preferably, the GO suspension 106 (see FIG. 5) undergoes the sonication process 112 (see FIG. 5) for an effective period of time to obtain a desired nano-size of the GO sheets 90 for coating the polymer nanoparticles 80, such as the polystyrene (PS) nanoparticles 81. When used to form the GO suspension 106 and prior to the sonication process 112, the GO sheets 90 initially have a sheet size 98 (see FIG. 5) in a range of from about 500 nm (five hundred nanometers)

to about 5 (five) microns. The GO suspension 106 undergoes the sonication process 112 for an effective period of time to reduce the sheet size 98 (see FIG. 5) of the GO sheets 90, such as the lateral dimensions of the GO sheets 90. After undergoing the sonication process 112 for an effective period of time, the GO sheets 90 (see FIGS. 4, 5) preferably have a sheet size 98 (see FIG. 5) in a range of from about 50 nm (fifty nanometers) to about 350 nm (three hundred fifty nanometers); more preferably, in a range of from about 150 nm (one hundred fifty nanometers) to about 300 nm (three hundred nanometers); and most preferably, in a range of from about 200 nm (two hundred nanometers) to about 300 nm (three hundred nanometers).

The sheet size 98 (see FIG. 5) of each individual or single GO sheet 90a (see FIG. 5) needs to be sufficient to completely and fully wrap the surface 86 (see FIG. 5) of a respective individual polymer nanoparticle 80a (see FIG. 5), where each polymer nanoparticle 80 has a particle size 88 (see FIG. 5) in a range of from about 30 nm (thirty nanometers) to about 180 nm (one hundred eighty nanometers). Each GO sheet 90 preferably has a thickness in a range of from about 1 nm (one nanometer) to about 5 nm (five nanometers).

Preferably, the GO suspension 106 undergoes the sonication process 112 at ambient temperature or room temperature, for a time period in a range of from about 1 h (one hour) to about 6 h (six hours). Preferably, during the sonication process 112 for the GO suspension 106, the room temperature is maintained below a thermal stability threshold of the GO sheets 90, for example, below 50° C. (fifty degrees Celsius). In one example, the GO suspension 106 was initially sonicated with the sonication process 112 (see FIGS. 4, 5) using the sonication apparatus 110 (see FIGS. 4, 5), in the form of a bath sonicator, for 2 h (two hours), at room temperature, and then was later sonicated with the sonication process 112 using the sonication apparatus 110 and the sonication probe portion 114 (see FIG. 4), for 3 h (three hours), at room temperature, in order to reduce the lateral dimension of the GO sheets 90.

As shown in FIG. 6A, the method 200 further comprises step 210 of mixing the sonicated polymer suspension 100a (see FIGS. 4, 5) and the sonicated graphene oxide (GO) suspension 106a (see FIGS. 4, 5) together in a mixing vessel 124 (see FIG. 4), to obtain a sonicated mixture 130 (see FIGS. 4, 5), such as a physical mixture. The mixing step 210 of mixing the sonicated polymer suspension 100a and the sonicated graphene oxide (GO) suspension 106a comprises mixing the sonicated polymer suspension 100a and the sonicated graphene oxide (GO) suspension 106a with a ratio of the plurality of polymer nanoparticles 80 to the plurality of graphene oxide (GO) sheets 90 in a range of from about 5.58:1.12 (w/w) (by weight, polymer nanoparticles to GO sheets) to about 6.09:0.91 (w/w) (by weight, polymer nanoparticles 80 to GO sheets 90). Preferably, the ratio is 6:1 (w/w) (by weight, polymer nanoparticles 80 to GO sheets 90).

As shown in FIG. 6A, the method 200 further comprises step 212 of heating the sonicated mixture 130 (see FIGS. 4, 5) in an inert atmosphere 132 (see FIG. 5) at an effective temperature 136 (see FIG. 5), and using an electrostatic process 140 (see FIGS. 4, 5), or electrostatic phenomena, to uniformly wrap individual polymer nanoparticles 80a (see FIG. 5) with individual graphene oxide (GO) sheets 90a (see FIG. 5), via an electrostatic interaction reaction 142 (see FIG. 5), to obtain the nano-reinforcement filler material 150 (see FIGS. 4, 5) comprising polymer-GO core-shell nanoparticles 152 (see FIGS. 4, 5).

The heating step 212 further comprises heating the sonicated mixture 130 at the effective temperature 136 in a range of from about 70° C. (seventy degrees Celsius) to about 100° C. (one hundred degrees Celsius). The heating step 212 further comprises heating the sonicated mixture 130 at an effective pressure 134 (see FIG. 5) comprising an atmospheric pressure 135 (see FIG. 5) in a range of from about 1 atm (one atmosphere) to about 12 atm (twelve atmospheres), and more preferably, at an atmospheric pressure 135 (see FIG. 5) of 1 atm (one atmosphere). The heating step 212 further comprises heating the sonicated mixture 130 for an effective time period 138 in a range of from about 3 h (three hours) to about 6 h (six hours). Preferably, the heating of the sonicated mixture 130 (see FIGS. 4, 5) is performed at a mix rate 133 (see FIG. 5) of about 400 rpm (four hundred revolutions per minute).

As shown in FIG. 6A, the method 200 further comprises step 214 of washing the nano-reinforcement filler material 150 (see FIGS. 4, 5). As shown in FIG. 6A, the method 200 further comprises step 216 of drying the nano-reinforcement filler material 150 (see FIGS. 4, 5). The drying of the nano-reinforcement filler material 150 (see FIGS. 4, 5) is preferably done at 45° C. (forty-five degrees Celsius) or another suitable temperature, in a hot air oven or other drying apparatus, for about 6-12 hours.

As shown in FIG. 6A, the method 200 further comprises step 218 of using or incorporating the nano-reinforcement filler material 150 (see FIGS. 4, 5) in the epoxy resin system 62 (see FIG. 5) for the composite structure 28 (see FIGS. 4, 5). The nano-reinforcement filler material 150 (see FIGS. 4, 5) provides a toughening nano-reinforcement 172 (see FIG. 5) to the epoxy resin system 62 (see FIG. 5).

The using step 218 further comprises using or incorporating the nano-reinforcement filler material 150 in the epoxy resin system 62 for the composite structure 28 comprising an epoxy composite structure 28a in an aircraft 12.

Figure 6B:
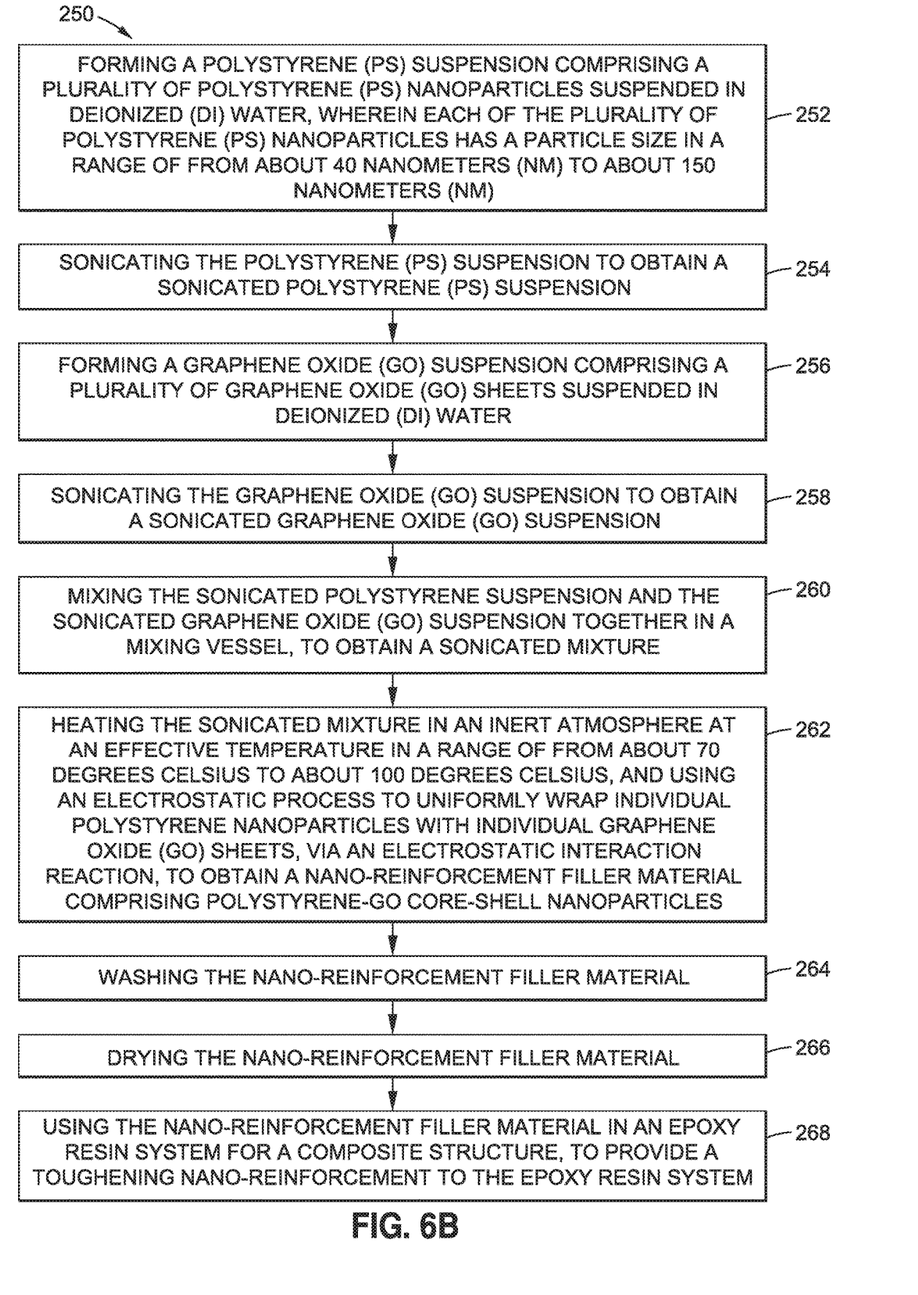

Now referring to FIG. 6B, in another embodiment, there is provided a method 250 of making a nano-reinforcement filler material 150 for an epoxy resin system 62 for a composite structure 28 using a plurality of polystyrene (PS) nanoparticles 81. FIG. 6B is an illustration of a flow diagram of another exemplary embodiment of a method 250 of the disclosure.

As shown in FIG. 6B, the method 250 comprises step 252 of forming or preparing a polystyrene (PS) suspension 101 comprising a plurality of polystyrene (PS) nanoparticles 81 suspended in deionized (DI) water 102. Preferably, each PS nanoparticle 81 (see FIG. 5) has a particle size 88 (see FIG. 5) in a range of from about 30 nm (thirty nanometers) to about 180 nm (one hundred eighty nanometers). More preferably, each PS nanoparticle 81 (see FIG. 5) has a particle size 88 (see FIG. 5) in a range of from about 40 nm (forty nanometers) to about 150 nm (one hundred fifty nanometers). Most preferably, each PS nanoparticle 80 has a particle size 88 in a range of from about 80 nm (eighty nanometers) to about 100 nm (one hundred nanometers). The step 252 of forming the PS suspension 101 of the method 250 further comprises forming 252 the PS suspension 101 having a concentration of 12 mg/ml (twelve milligrams per milliliter). The PS nanoparticles 81 may be synthesized by emulsion polymerization. Polymerization and synthesis of the PS nanoparticle 81 seed may take 5 h (five hours) to 12 h (twelve hours).

As shown in FIG. 6B, the method 250 further comprises step 254 of sonicating the polystyrene suspension 101 to obtain a sonicated polymer suspension 101a. The sonication process 112 (see FIGS. 4, 5) and the sonication apparatus 110 (see FIGS. 4, 5) are discussed in detail above with regard to FIGS. 4 and 5.

As shown in FIG. 6B, the method 250 further comprises step 256 of forming or preparing a graphene oxide (GO) suspension 106 comprising a plurality of graphene oxide (GO) sheets 90 suspended in deionized (DI) water 102. The step 256 of forming the GO suspension 106 of the method 250 further comprises forming the GO suspension 106 with each of the plurality of graphene oxide (GO) sheets 90. The step 256 of forming the GO suspension 106 of the method 250 further comprises forming the GO suspension 106 having a concentration of 1 mg/ml (one milligram per milliliter). The GO suspension 106 comprises the plurality of GO sheets 90 suspended in the DI water 102, and the plurality of GO sheets 90 may be suspended or mixed in the DI water 102 with the help of the sonication process 112 (see also FIG. 5), such as the bath sonication process, using the sonication apparatus 110 (see also FIG. 5), such as a bath sonicator.

As shown in FIG. 6B, the method 250 further comprises step 258 of sonicating the graphene oxide (GO) suspension 106 to obtain a sonicated graphene oxide (GO) suspension 106*a*. The sonicated graphene oxide (GO) suspension 106*a* preferably has a reduced lateral dimension or size of the GO sheets 90. Based on process parameters (sonication energy and time), the sheet size 98 (see FIG. 5) of the GO sheets 90 may be tuned or tailored as desired. The sonication process 112 (see FIGS. 4, 5) and the sonication apparatus 110 (see FIGS. 4, 5) are discussed in detail above with regard to FIGS. 4 and 5.

Preferably, the GO suspension 106 (see FIG. 5) undergoes the sonication process 112 (see FIG. 5) for an effective period of time to obtain a desired nano-size of the GO sheets 90 for coating the polymer nanoparticles 80, such as the polystyrene (PS) nanoparticles 81. When used to form the GO suspension 106 and prior to the sonication process 112, the GO sheets 90 initially have a sheet size 98 (see FIG. 5) in a range of from about 500 nm (five hundred nanometers) to about 5 (five) microns. The GO suspension 106 undergoes the sonication process 112 for an effective period of time to reduce the sheet size 98 (see FIG. 5) of the GO sheets 90, such as the lateral dimensions of the GO sheets 90. After undergoing the sonication process 112 for an effective period of time, the GO sheets 90 (see FIGS. 4, 5) preferably have a sheet size 98 (see FIG. 5) in a range of from about 50 nm (fifty nanometers) to about 350 nm (three hundred fifty nanometers); more preferably, in a range of from about 150 nm (one hundred fifty nanometers) to about 300 nm (three hundred nanometers); and most preferably, in a range of from about 200 nm (two hundred nanometers) to about 300 nm (three hundred nanometers).

The sheet size 98 (see FIG. 5) of each individual or single GO sheet 90*a* (see FIG. 5) needs to be sufficient to completely and fully wrap the surface 86 (see FIG. 5) of a respective individual polymer nanoparticle 80*a* (see FIG. 5), where each polymer nanoparticle 80 has a particle size 88 (see FIG. 5) in a range of from about 30 nm (thirty nanometers) to about 180 nm (one hundred eighty nanometers). Each GO sheet 90 preferably has a thickness in a range of from about 1 nm (one nanometer) to about 5 nm (five nanometers).

Preferably, the GO suspension 106 undergoes the sonication process 112 at ambient temperature or room temperature, for a time period in a range of from about 1 h (one hour) to about 6 h (six hours). Preferably, during the sonication process 112 for the GO suspension 106, the room temperature is maintained below a thermal stability threshold of the GO sheets 90, for example, below 50° C. (fifty degrees Celsius). In one example, the GO suspension 106 was initially sonicated with the sonication process 112 (see FIGS. 4, 5) using the sonication apparatus 110 (see FIGS. 4, 5), in the form of a bath sonicator, for 2 h (two hours), at room temperature, and then was later sonicated with the sonication process 112 using the sonication apparatus 110 and the sonication probe portion 114 (see FIG. 4), for 3 h (three hours), at room temperature, in order to reduce the lateral dimension of the GO sheets 90.

As shown in FIG. 6B, the method 250 further comprises step 260 of mixing the sonicated PS suspension 101*a* and the sonicated graphene oxide (GO) suspension 106*a* together in a mixing vessel 124, to obtain a sonicated mixture 130*a*. The sonication process 112 (see FIGS. 4, 5) and the sonication apparatus 110 (see FIGS. 4, 5) are discussed in detail above with regard to FIGS. 4 and 5.

The step 260 of mixing the sonicated PS suspension 101*a* and the sonicated GO suspension 106*a* of the method 250 of claim 10 further comprises mixing the sonicated PS suspension 101*a* and the sonicated GO suspension 106*a* in a ratio of the plurality of PS nanoparticles 80 to the plurality of GO sheets 90 in a range of from about 5.58:1.12 (w/w) (by weight, polystyrene (PS) nanoparticles to GO sheets) to about 6.09:0.91 (w/w) (by weight, polystyrene (PS) nanoparticles to GO sheets). Preferably, the ratio of the plurality of PS nanoparticles 80 to the plurality of GO sheets 90 is 6:1 (w/w).

As shown in FIG. 6B, the method 250 further comprises step 262 of heating the sonicated mixture 130*a* in an inert atmosphere 132 at an effective temperature 136 in a range of from about 70° C. (seventy degrees Celsius) to about 100° C. (one hundred degrees Celsius), and using an electrostatic process 140 to uniformly wrap individual polystyrene nanoparticles 81*a* with individual graphene oxide (GO) sheets 90*a*, via an electrostatic interaction reaction 142, to obtain the nano-reinforcement filler material 150*a* comprising polystyrene-GO core-shell nanoparticles 152*a*.

The step 262 of heating the sonicated mixture 130*a* of the method 250 further comprises heating at an effective pressure 134 (see FIG. 5) comprising an atmospheric pressure 135 (see FIG. 5) in a range of from about 1 atm (one atmosphere) to about 12 atm (twelve atmospheres), and more preferably, at an atmospheric pressure 135 (see FIG. 5) of 1 atm (one atmosphere). The step 262 of heating the sonicated mixture 130*a* of the method 250 further comprises heating for an effective time period 138 in a range of from about 3 h (three hours) to about 6 h (six hours). Preferably, the heating of the sonicated mixture 130 (see FIGS. 4, 5) is performed at a mix rate 133 (see FIG. 5) of about 400 rpm (four hundred revolutions per minute).

As shown in FIG. 6B, the method 250 further comprises step 264 of washing the nano-reinforcement filler material 150*a*. As shown in FIG. 6B, the method 250 further comprises step 266 of drying the nano-reinforcement filler material 150*a*. The drying of the nano-reinforcement filler material 150 (see FIGS. 4, 5) is preferably done at 45° C. (forty-five degrees Celsius) or another suitable temperature, in a hot air oven or other drying apparatus.

As shown in FIG. 6B, the method 250 comprises step 268 of using or incorporating the nano-reinforcement filler material 150*a* in the epoxy resin system 62 for the composite structure 28. The nano-reinforcement filler material 150*a* provides a toughening nano-reinforcement 172 to the epoxy resin system 62.

EXAMPLE

In one exemplary embodiment, polymer-graphene oxide (GO) core-shell nanoparticles 152 (see FIGS. 4, 5), in the form of polystyrene (PS)-GO core-shell nanoparticles 152a (see FIG. 5), were prepared and obtained, as a result of electrostatic interaction reactions 142 (see FIG. 5) (i.e., electrostatic forces).

The polystyrene (PS) nanoparticles 81 (see HG. 5) were synthesized by an emulsion polymerization process, i.e., dispersion of the PS nanoparticles in deionized (DI) water 102 (see FIGS. 4, 5). A polystyrene (PS) suspension 101 (see FIG. 5) was formed with PS nanoparticles 81 having a concentration of 12 mg/ml (twelve milligrams per milliliter) suspended in 200 ml (two hundred milliliters) of DI water 102 in a first vessel 104 (see FIG. 4) in the form of a beaker, at room temperature. The PS nanoparticles 81 had a particle size 88 (see FIG. 5) of 130 nm (nanometers).

The PS suspension 101 (see FIG. 5) was then sonicated to obtain a sonicated polystyrene (PS) suspension 101a (see FIG. 5). The PS suspension 101 was sonicated in the first vessel 104 (see FIG. 4) with a sonication process 112 (see FIGS. 4, 5) using a sonication apparatus 110 (see FIGS. 4, 5) for 15 min. (fifteen minutes), at room temperature.

Graphene oxide (GO) sheets 90 (see FIGS. 4, 5) were synthesized by modified Hummer's method, i.e., a chemical process used to generate graphite oxide through the addition of potassium permanganate to a solution of graphite, sodium nitrate, and sulfuric acid, and modified to create graphene oxide. The synthesized GO sheets were suspended in 200 ml (two hundred milliliters) of deionized (DI) water 102 (see FIGS. 4, 5) at a concentration of 1 mg/ml (ten milligrams per milliliter), at room temperature, in a second vessel 108 (see FIG. 4), such as another beaker, to obtain a graphene oxide (GO) suspension 106 (see FIG. 5).

The GO suspension 106 (see FIGS. 4, 5) was then sonicated to obtain a sonicated graphene oxide (GO) suspension 106a (see FIGS. 4, 5). The GO suspension 106 was initially sonicated with a sonication process 112 (see FIGS. 4, 5) using a sonication apparatus 110 (see FIGS. 4, 5), in the form of a bath sonicator, for 2 h (two hours), at room temperature, and then was later sonicated with the sonication process 112 using the sonication apparatus 110 and the sonication probe portion 114 (see FIG. 4) for 3 h (three hours), at room temperature, in order to reduce the lateral dimension of the synthesized GO sheets to 200 nm (two hundred nanometers) to 300 nm (three hundred nanometers), from an initial size of from 500 nm (five hundred nanometers) to 5 (five) microns. The sonicated GO suspension 106a and the sonicated PS suspension 101a were prepared separately in separate beakers.

The sonicated PS suspension 101a (see FIG. 5) and the sonicated GO suspension 106a (see FIG. 5) were then mixed together in a mixing vessel 124 (see FIG. 4), e.g., another beaker, with DI water 102 (see FIG. 5), at a mix rate of 400 rpm (four hundred revolutions per minute), to form a sonicated mixture 130 (see FIGS. 4, 5). The sonicated mixture 130 had a ratio of 1:6, by weight, of 1 (one) part GO sheets to 6 (six) parts PS nanoparticles. The sonicated mixture 130 (see FIGS. 4, 5) was mixed and was heated with a heating apparatus 126, in the form of a hot plate, in an inert atmosphere, at 70° C. (seventy degrees Celsius), at an atmospheric pressure of 1 atm (one atmosphere), for 6 h (six hours), to obtain a final product in the form of nano-reinforcement filler material 150a (see FIG. 5) comprising polystyrene (PS)-GO core-shell nanoparticles 152a (see FIG. 5). The final product in the form of the nano-reinforcement filler material 150a (see FIG. 5) comprising the PS-GO core-shell nanoparticles 152a (see FIG. 5) was washed with deionized (DI) water. The final product in the form of the nano-reinforcement filler material 150a (see FIG. 5) comprising the PS-GO core-shell nanoparticles 152a (see FIG. 5) was then dried in a hot air oven at 45° C. (forty-five degrees Celsius) overnight.

Characterization. The structure and morphology of the PS-GO core-shell nanoparticles 152a (see FIG. 5) were studied using an FEI Sirion XL30 FEG (field-emission electron source) scanning electron microscope (SEM) obtained from FEI of Hillsboro, Oreg., USA. The PS-GO core-shell nanoparticles 152a (see FIG. 5) were dispersed in DI water using a sonication process, e.g., bath sonication, for 30 (thirty) minutes, to obtain a PS-GO core-shell nanoparticle suspension. The PS-GO core-shell nanoparticle suspension was drop casted on a silicon substrate which was freshly cleaned. The PS-GO core-shell nanoparticle suspension samples were coated with a 10 nm (ten nanometers) thick Au (gold) layer to avoid charge accumulation.

Results. The FEI Sirion XL30 FEG scanning electron microscope (SEM) showed the PS-GO core-shell nanoparticles 152a (see FIG. 5) as discrete, wrapped, individual polystyrene (PS) nanoparticles 81a (see FIG. 5) wrapped with individual graphene oxide (GO) sheets 90a (see FIG. 5). The average size of the PS-GO core-shell nanoparticles 152a (see FIG. 5), i.e., GO wrapped PS nanoparticles, was 130 nm (one hundred thirty nanometers), and was measured by a dynamic light scattering (DLS) technique (which determines a size distribution profile of nanoparticles in suspension). The FEI Sirion XL30 FEG SEM micrographs confirmed the size of the PS-GO core-shell nanoparticles 152a (see FIG. 5), i.e., GO wrapped PS nanoparticles, to be the same size as those obtained by DLS.

To summarize this example, the PS-GO core-shell nanoparticles 152a (see FIG. 5), i.e., the GO wrapped PS nanoparticles, were synthesized using electrostatic interaction reactions of oppositely charged GO sheets (negative charge) and PS nanoparticles (positive charge), and resulted in self-assembled PS-GO core-shell nanoparticles. The PS-GO core-shell nanoparticles 152a (see FIG. 5), i.e., the GO wrapped PS nanoparticles, were discrete and separate with no GO wrapped agglomerated PS nanoparticles because of the reduced sheet size of the GO sheets used, which avoided and eliminated wrapping of multiple PS nanoparticles in a single large GO sheet.

Disclosed embodiments of the nano-reinforcement filler material 150 (see FIGS. 4, 5), the nano-reinforcement filler material 150a (see FIGS. 4, 5), the method 200 (see FIG. 6A), and the method 250 (see FIG. 6B) provide for a novel organic toughening nano-reinforcement 172 (see FIG. 5) based on polymer nanoparticles 80 (see FIGS. 4, 5), such as polystyrene (PS) nanoparticles 81 (see FIG. 5), that are fully and completely wrapped or coated by graphene oxide (GO) sheets 90 (see FIGS. 4, 5) in a smooth manner with a smooth wrapped surface 162 (see FIG. 5), without any crumpling or wrinkling or with a reduced crumpling 164 (see FIG. 5), of the GO sheets 90. The full potential of the GO sheets 90 may be utilized in the absence of crumpling and agglomeration of the GO sheets 90. Reduced crumpling 164 (see FIG. 5) and reduced agglomeration provide for more efficient mechanical interaction with the epoxy resin 66 (see FIG. 5) of the epoxy resin system 62 (see FIG. 5), and reduces any anisotropy that may result with larger, loosely placed GO sheets. The nano-reinforcement filler material 150 (see FIGS. 4, 5) and the nano-reinforcement filler material 150a (see FIGS. 4, 5) enhance the mechanical properties 72 (see FIG. 5) of the epoxy resin system 62 (see FIG. 5), and provide reduced defect structure level 170 (see FIG. 5) and enhanced interface area 158 (see FIG. 5) at the interface between the graphene oxide (GO) sheets 90 and the epoxy resin system 62 (see FIG. 5), as compared to known GO sheets. Such enhanced interface area 158 and surface area of the GO sheets 90 for interaction with the epoxy resin 66 of the epoxy resin system 62 (see FIG. 5), may result in reduce manufacturing costs, reduced fabrication time 168 (see FIG. 5), and leads to better mechanical properties 72 (see FIG. 5). Moreover, the smooth wrapped surface 162 (see FIG. 5) of the GO sheets 90 (see FIG. 5) allows enhanced interaction with the epoxy resin system 62 (see FIG. 5) matrix and the spherical morphology of the nano-reinforcement filler material 150 (see FIGS. 4, 5) and the nano-reinforcement filler material 150a (see FIGS. 4, 5) creates enhanced surface area for better interaction.

Further, the nano-reinforcement material 150 (see FIG. 5) comprising the polymer-GO core-shell nanoparticles 152 (see FIG. 5) does not exhibit restacking or has a reduced restacking 166 (see FIG. 5) of the GO sheets 90. The smooth wrapped surface 162 (see FIG. 5) of the GO sheets 90 (see FIG. 5) provides for reduced restacking 166 (see FIG. 5) of GO sheets 90 post formation or synthesis during drying of the nano-reinforcement filler material 150, which is unavoidable in the case of known planar form graphene sheets, as such known planar form graphene sheets are strongly anchored on the polymer nanoparticle, such as PS nanoparticle, surface. In turn, reduced restacking 166 (see FIG. 5) of the GO sheets 90 allows for a more efficient use of the GO sheets 90 (see FIGS. 4, 5) in composite structures 28 (see FIGS. 1, 4, 5).

In addition, disclosed embodiments of the nano-reinforcement filler material 150 (see FIGS. 4, 5), the nano-reinforcement filler material 150a (see FIGS. 4, 5), the method 200 (see FIG. 6A), and the method 250 (see FIG. 6B) eliminate the requirement of a solvent at any stage of the polymer nanoparticle 80 formation or synthesis, or for dispersion of the GO sheets 90 (see FIGS. 4, 5) in the composite structure 28 (see FIGS. 4, 5), and provide a solvent-free process 144 (see FIG. 5). This is useful since use of solvent may lead to residual solvent that can cause deterioration of mechanical properties of the epoxy resin system 62 (see FIG. 5) and the composite structure 28 (see FIG. 5). Eliminating the solvent removal process reduces the cost of the fabrication of the nano-reinforcement filler material 150, as energy consuming long hours of use of a vacuum oven for removal of the solvent is not required. Moreover, the method 200 (see FIG. 6A) and method 250 (see FIG. 6B) remove the time consuming step of conditioning of the epoxy resin 66 after addition of the nano-reinforcement filler material 150, as no solvent is involved which makes the process of fabrication of the nano-reinforcement filler material 150 and the nano-composite highly time efficient. The nano-reinforcement filler material 150 (see FIGS. 4, 5) does not require further surface functionalization.

Further, disclosed embodiments of the nano-reinforcement filler material 150 (see FIGS. 4, 5), the nano-reinforcement filler material 150a (see FIGS. 4, 5), the method 200 (see FIG. 6A), and the method 250 (see FIG. 6B) provide a reduced fabrication time 168 (see FIG. 5) or a significant reduced duration of the composite fabrication process, for example, from 24 h (twenty-four hours) down to 7 h (seven hours), primarily due to the elimination of the solvent removal step. Removal of solvent is a time consuming and costly process, which is avoided by the disclosed nano-reinforcement filler material 150 (see FIGS. 4, 5), nano-reinforcement filler material 150a (see FIGS. 4, 5), method 200 (see FIG. 6A), and method 250 (see FIG. 6B).

Moreover, disclosed embodiments of the nano-reinforcement filler material 150 (see FIGS. 4, 5), the nano-reinforcement filler material 150a (see FIGS. 4, 5), the method 200 (see FIG. 6A), and the method 250 (see FIG. 6B) provide discrete, individual polymer nanoparticles 80a (see FIG. 5) wrapped or coated by individual GO sheets 90a (see FIG. 5) with a reduced number of GO wrapped polymer nanoparticle agglomerates. The size of the GO sheets 90 used is matched to the size of the polymer nanoparticles 80, such as the PS nanoparticles 81, to facilitate wrapping or coating of individual polymer nanoparticles 80a (see FIG. 5). The smaller size (40 nm to 150 nm) of the polymer nanoparticles 80 as compared to known nanoparticles provides a low level of defect structure, and enhanced chemical bonding with the epoxy resin 66 (see FIG. 5), leading to improved mechanical properties 72 (see FIG. 5) at the same loading level.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A method of making a nano-reinforcement filler material for an epoxy resin system for a composite structure, the method comprising the steps of:
   forming a polymer suspension comprising a plurality of polymer nanoparticles suspended in deionized (DI) water;
   sonicating the polymer suspension to obtain a sonicated polymer suspension; forming a graphene oxide (GO) suspension comprising a plurality of graphene oxide (GO) sheets suspended in deionized (DI) water;
   sonicating the graphene oxide (GO) suspension to obtain a sonicated graphene oxide (GO) suspension;
   mixing the sonicated polymer suspension and the sonicated graphene oxide (GO) suspension together in a mixing vessel, to obtain a sonicated mixture; and
   heating the sonicated mixture in an inert atmosphere at an effective temperature in a range of from 7020 C. (seventy degrees Celsius) to about 100° C. (one hundred degrees Celsius), and using an electrostatic process to uniformly wrap individual polymer nanoparticles with individual graphene oxide (GO) sheets, via an electrostatic interaction reaction, to obtain the nano-reinforcement filler material comprising polymer-GO core-shell nanoparticles.

2. The method of claim 1 wherein forming the polymer suspension comprises forming the polymer suspension with each of the plurality of polymer nanoparticles having a particle size in a range of from about 40 nm (forty nanometers) to about 150 nm (one hundred fifty nanometers).

3. The method of claim 1 wherein forming the polymer suspension comprises forming the polymer suspension with each of the plurality of polymer nanoparticles comprising a polymer selected from the group consisting of polystyrene, poly(methyl methacrylate) (PMMA), poly(butyl acrylate) (PBA), poly(butyl acrylate)-poly(methyl methacrylate) (PBA-PMMA), butyl methyl acrylate (BMA), polyvinyl acetate, polyvinyl acetate copolymers, polychloroprene (neoprene), nitrile rubber, acrylic rubber, fluoroelastomer (FKM), polyisoprene, polyvinylidene fluoride, polytetrafluoroethylene (PTFE), polyvinyl fluoride (PVF), acrylonitrile butadiene styrene (ABS), polyvinyl chloride (PVC), and styrene-butadiene.

4. The method of claim 1 wherein forming the graphene oxide (GO) suspension comprises forming the graphene oxide (GO) suspension with each of the plurality of graphene oxide (GO) sheets having a sheet size in a range of from about 50 nm (fifty nanometers) to about 350 nm (three hundred fifty nanometers).

5. The method of claim 1 wherein mixing the sonicated polymer suspension and the sonicated graphene oxide (GO) suspension comprises mixing the sonicated polymer suspension and the sonicated graphene oxide (GO) suspension in a ratio of the plurality of polymer nanoparticles to the plurality of graphene oxide (GO) sheets of 6:1 (w/w).

6. The method of claim 1 wherein heating the sonicated mixture comprises heating at an effective pressure comprising an atmospheric pressure in a range of from about 1 atm (one atmosphere) to about 12 atm (twelve atmospheres).

7. The method of claim 1 wherein heating the sonicated mixture comprises heating for an effective time period in a range of from about 3 h (three hours) to about 6 h (six hours).

8. The method of claim 1 wherein the nano-reinforcement filler material is used in the epoxy resin system for the composite structure comprising an epoxy composite structure in an aircraft.

9. A method of making a nano-reinforcement filler material for an epoxy resin system for a composite structure, the method comprising the steps of:
forming a polystyrene (PS) suspension comprising a plurality of polystyrene (PS) nanoparticles suspended in deionized (DI) water, wherein each of the plurality of polystyrene (PS) nanoparticles has a particle size in a range of from about 40 nm (forty nanometers) to 150 nm (one hundred fifty nanometers);
sonicating the polystyrene (PS) suspension to obtain a sonicated polystyrene (PS) suspension;
forming a graphene oxide (GO) suspension comprising a plurality of graphene oxide (GO) sheets suspended in deionized (DI) water;
sonicating the graphene oxide (GO) suspension to obtain a sonicated graphene oxide (GO) suspension;
mixing the sonicated polystyrene suspension and the sonicated graphene oxide (GO) suspension together in a mixing vessel, to obtain a sonicated mixture; and
heating the sonicated mixture in an inert atmosphere at an effective temperature in a range of from about 70° C. (seventy degrees Celsius) to about 100° C. (one hundred degrees Celsius), and using an electrostatic process to uniformly wrap individual polystyrene (PS) nanoparticles with individual graphene oxide (GO) sheets, via an electrostatic interaction reaction, to obtain the nano-reinforcement filler material comprising polystyrene-GO core-shell nanoparticles.

10. The method of claim 9 wherein forming the graphene oxide (GO) suspension comprises forming the graphene oxide (GO) suspension with each of the plurality of graphene oxide (GO) sheets having a sheet size in a range of from about 50 nm (fifty nanometers) to about 350 nm (three hundred fifty nanometers).

11. The method of claim 9 wherein forming the polystyrene suspension comprises forming the polystyrene suspension having a concentration of 12 mg/ml (twelve milligrams per milliliter), and further wherein forming the graphene oxide (GO) suspension comprises forming the graphene oxide (GO) suspension having a concentration of 1 mg/ml (one milligram per milliliter).

12. The method of claim 9 wherein mixing the sonicated polystyrene (PS) suspension and the sonicated graphene oxide (GO) suspension comprises mixing the sonicated polystyrene (PS) suspension and the sonicated graphene oxide (GO) suspension in a ratio of the plurality of polystyrene (PS) nanoparticles to the plurality of graphene oxide (GO) sheets of 6:1 (w/w).

13. The method of claim 9 wherein heating the sonicated mixture comprises heating at an effective pressure comprising an atmospheric pressure in a range of from about 1 atm (one atmosphere) to about 12 atm (twelve atmospheres).

14. The method of claim 9 wherein heating the sonicated mixture comprises heating for an effective time period in a range of from about 3 h (three hours) to about 6 h (six hours).

15. The method of claim 1 wherein forming the graphene oxide (GO) suspension comprising the plurality of graphene oxide (GO) sheets suspended in deionized (DI) water further comprises, matching a sheet size of each of the plurality of graphene oxide (GO) sheets to the particle size of each of the plurality of polymer nanoparticles, to facilitate uniform wrapping of the individual polymer nanoparticles with the individual graphene oxide (GO) sheets.

16. The method of claim 1 wherein the nano-reinforcement filler material provides a toughening nano-reinforcement to the epoxy resin system.

17. The method of claim 9 wherein forming the graphene oxide (GO) suspension comprising the plurality of graphene oxide (GO) sheets suspended in deionized (DI) water comprises, matching a sheet size of each of the plurality of graphene oxide (GO) sheets to the particle size of each of the plurality of polystyrene (PS) nanoparticles, to facilitate uniform wrapping of the individual polystyrene (PS) nanoparticles with the individual graphene oxide (GO) sheets.

18. The method of claim 10 wherein the nano-reinforcement filler material provides a toughening nano-reinforcement to the epoxy resin system.

19. The method of claim 9 wherein the nano-reinforcement filler material is used in the epoxy resin system for the composite structure comprising an epoxy composite structure in an aircraft.

* * * * *

UNITED STATES PATENT AND TRADEMARK OFFICE
CERTIFICATE OF CORRECTION

PATENT NO. : 10,214,620 B2
APPLICATION NO. : 15/582475
DATED : February 26, 2019
INVENTOR(S) : Om Prakash, Megha Sahu and Ashok Raichur Page 1 of 1

It is certified that error appears in the above-identified patent and that said Letters Patent is hereby corrected as shown below:

In the Claims

Column 20, Claim 1, Lines 35-38: Please add a return after "suspension;" and before "forming", and replace "sonicating the polymer suspension to obtain a sonicated polymer suspension; forming a graphene oxide (GO) suspension comprising a plurality of graphene oxide (GO) sheets suspended in deionized (DI) water;" with
--sonicating the polymer suspension to obtain a sonicated polymer suspension;
    forming a graphene oxide (GO) suspension comprising a plurality of graphene oxide (GO) sheets suspended in deionized (DI) water;--.

Column 20, Claim 1, Line 45: Please replace "7020 C." with --70° C.--.

Column 22, Claim 18, Line 47: Please replace "The method of claim 10" with --The method of claim 9--.

Signed and Sealed this
Twenty-fifth Day of June, 2019

Andrei Iancu
*Director of the United States Patent and Trademark Office*